(12) United States Patent
Gower et al.

(10) Patent No.: US 11,442,900 B2
(45) Date of Patent: Sep. 13, 2022

(54) SHARING RESOURCES AMONG REMOTE REPOSITORIES UTILIZING A LOCK FILE IN A SHARED FILE SYSTEM OR A NODE GRAPH IN A PEER-TO-PEER SYSTEM

(71) Applicant: International Business Machines Corporation, Armonk, NY (US)

(72) Inventors: Barry P. Gower, Poughkeepsie, NY (US); Larry R. Hamann, Raleigh, NC (US); Andrew S. Myers, Wayland, MA (US); Seth R. Peterson, Raleigh, NC (US); Davanum M. Srinivas, Sharon, MA (US); Donald R. Woods, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 16/288,480

(22) Filed: Feb. 28, 2019

(65) Prior Publication Data
US 2019/0197025 A1 Jun. 27, 2019

Related U.S. Application Data

(62) Division of application No. 14/463,807, filed on Aug. 20, 2014, now Pat. No. 10,318,487.

(51) Int. Cl.
*H04L 67/00* (2022.01)
*G06F 16/176* (2019.01)
(Continued)

(52) U.S. Cl.
CPC ........ *G06F 16/1774* (2019.01); *G06F 16/182* (2019.01); *G06F 16/951* (2019.01); *H04L 67/1097* (2013.01); *H04L 67/60* (2022.05)

(58) Field of Classification Search
None
See application file for complete search history.

(56) References Cited

U.S. PATENT DOCUMENTS 5,894,555 A 4/1999 Harada et al.
7,788,223 B2 8/2010 Liu et al.
(Continued)

OTHER PUBLICATIONS

Mell et al., "The NIST Definition of Cloud Computing," Special Publication 800-145, Sep. 2011, pp. 1-7.
(Continued)

*Primary Examiner* — Tuankhanh D Phan
(74) *Attorney, Agent, or Firm* — Robert A. Voigt, Jr.; Shackelford, Bowen, McKinley & Norton, LLP

(57) ABSTRACT

A method, system and computer program product for sharing resources among remote repositories. In a shared file system, a resource identifier and metadata are created for a resource, where the resource identifier is stored in a lock file in a shared volume accessible by the remote repositories. The lock file is then released in response to distributing the associated resource to the remote repositories. Alternatively, in a peer-to-peer system, a request is received to create, read, update or delete a resource stored in a content repository. A resource name, a resource version and/or a resource fingerprint are received in connection with the request to create, read, update or delete the resource in the content repository. A determination is then made as to whether the received resource name, resource version and/or resource fingerprint matches the respective resource name, resource version and/or resource fingerprint stored in a node graph for the resource.

20 Claims, 14 Drawing Sheets

(51) Int. Cl.
*G06F 16/951* (2019.01)
*H04L 67/1097* (2022.01)
*G06F 16/182* (2019.01)
*H04L 67/60* (2022.01)

(56) References Cited

U.S. PATENT DOCUMENTS

| | | | | |
|---|---|---|---|---|
| 8,543,781 | B2* | 9/2013 | Rawat | G06F 16/1774 |
| | | | | 711/156 |
| 10,021,179 | B1* | 7/2018 | Velummylum | G06F 16/14 |
| 2011/0087633 | A1* | 4/2011 | Kreuder | G06F 16/273 |
| | | | | 707/610 |
| 2012/0095945 | A1* | 4/2012 | Jones | G06N 5/00 |
| | | | | 706/45 |
| 2012/0278281 | A1 | 11/2012 | Meisels et al. | |
| 2014/0344327 | A1 | 11/2014 | Lovric et al. | |
| 2016/0055170 | A1 | 2/2016 | Gower et al. | |

OTHER PUBLICATIONS

List of IBM Patents or Patent Applications Treated as Related, Feb. 28, 2019, pp. 1-2.
Office Action for U.S. Appl. No. 16/288,399 dated Aug. 19, 2021, pp. 1-18.
Office Action for U.S. Appl. No. 16/288,399 dated Mar. 3, 2022, pp. 1-16.

* cited by examiner

SHARING RESOURCES AMONG REMOTE REPOSITORIES UTILIZING A LOCK FILE IN A SHARED FILE SYSTEM OR A NODE GRAPH IN A PEER-TO-PEER SYSTEM

TECHNICAL FIELD

The present invention relates generally to cloud computing, and more particularly to sharing resources among remote repositories utilizing a lock file in a shared file system or a node graph in a peer-to-peer system.

BACKGROUND

In a cloud computing environment, computing is delivered as a service rather than a product, whereby shared resources, software and information are provided to computers and other devices as a metered service over a network, such as the Internet. In such an environment, computation, software, data access and storage services are provided to users that do not require knowledge of the physical location and configuration of the system that delivers the services.

The functions of the cloud computing environment are performed by a data center, which includes various types of hardware components (e.g., storage controllers, network switches, physical compute machines) stored in racks. Sharing resources (e.g., data) stored in local repositories, such as compute machines on these racks, among other repositories can be cumbersome, especially when data can be modified at any of the repositories.

Currently, when resources are shared across repositories, the resource metadata is required to be bundled with the resource. Hence, the resource is required to be shared completely again when only the metadata is updated. Furthermore, if the metadata is stored alongside the resource as a second resource, then there is a chance that the two resources will become out of sync with each other, especially in a system where resources may be updated frequently, such as in a cloud computing environment.

Content versioning systems that attempt to keep track of the versions of the resources may be viewed as an alternative. However, such systems require a central repository and a significant amount of resources (e.g., physical and virtual resources, such as processing usage, memory usage, storage usage) for tracking the versions of resources being shared among the repositories.

Unfortunately, there is not currently a means for sharing resources among repositories utilizing few resources without the possibility of the resource (e.g., data) and resource metadata becoming out of sync.

SUMMARY

In one embodiment of the present invention, a method for sharing resources among remote repositories comprises receiving a request to create, read, update or delete a resource in a content repository. The method further comprises receiving one or more of a resource name, a resource version and a resource fingerprint in connection with the request to create, read, update or delete the resource in the content repository. The method additionally comprises determining, by a processor, if one or more of the received resource name, the received resource version and the received resource fingerprint match a respective one or more of a resource name, a resource version and a resource fingerprint stored in a node graph stored in a local repository.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
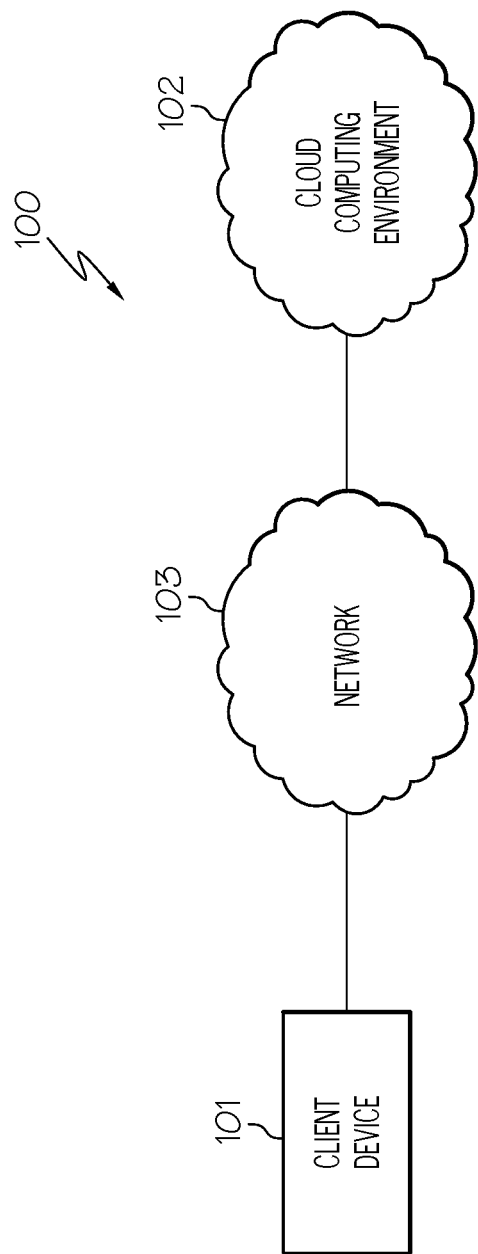
FIG. 1 illustrates a network system configured in accordance with an embodiment of the present invention.

The present invention comprises a method, system and computer program product for sharing resources among remote repositories. In one embodiment of the present invention directed to a shared file system, a resource identifier and metadata are created for a resource, where the resource identifier is stored in a lock file in a shared volume accessible by the remote repositories and is used to point to the resource and metadata stored in the shared volume. A lock file is a file that is associated with a particular resource and is used as a means for restricting access to the resource by allowing only one user or process access to the resource at any specific time. The lock file is then released in response to distributing the associated resource to the remote repositories. In an alternative embodiment of the present invention directed to a peer-to-peer system, a request is received to create, read, update or delete a resource stored in a content repository. A resource name, a resource version and/or a resource fingerprint are received in connection with the request to create, read, update or delete the resource in the content repository. A determination is then made as to whether the received resource name, resource version and/or resource fingerprint matches the respective resource name, resource version and/or resource fingerprint in the node graph for the resource. A node graph is a hierarchical tree of nodes associated with a resource, where the nodes may have data associated with it, such as a resource name, a resource version and a resource fingerprint. In this manner, resources are shared among repositories utilizing few resources (e.g., physical and virtual resources, such as processing usage, memory usage, storage usage) without the resource and resource metadata becoming out of sync via the use of lock files in a shared file system or via the use of node graphs in a peer-to-peer system.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

It is understood in advance that although this disclosure includes a detailed description on cloud computing, implementation of the teachings recited herein are not limited to a cloud computing environment. Rather, the embodiments of the present invention are capable of being implemented in conjunction with any type of clustered computing environment now known or later developed.

In any event, the following definitions have been derived from the "The NIST Definition of Cloud Computing" by Peter Mell and Timothy Grance, dated September 2011, which is cited on an Information Disclosure Statement filed herewith, and a copy of which is provided to the U.S. Patent and Trademark Office.

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Characteristics are as follows:

On-Demand Self-Service: A consumer can unilaterally provision computing capabilities, such as server time and network storage, as needed, automatically without requiring human interaction with each service's provider.

Broad Network Access: Capabilities are available over a network and accessed through standard mechanisms that promote use by heterogeneous thin or thick client platforms (e.g., mobile phones, tablets, laptops and workstations).

Resource Pooling: The provider's computing resources are pooled to serve multiple consumers using a multi-tenant model, with different physical and virtual resources dynamically assigned and reassigned according to consumer demand. There is a sense of location independence in that the consumer generally has no control or knowledge over the exact location of the provided resources but may be able to specify location at a higher level of abstraction (e.g., country, state or data center). Examples of resources include storage, processing, memory and network bandwidth.

Rapid Elasticity: Capabilities can be elastically provisioned and released, in some cases automatically, to scale rapidly outward and inward commensurate with demand. To the consumer, the capabilities available for provisioning often appear to be unlimited and can be purchased in any quantity at any time.

Measured Service: Cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): The capability provided to the consumer is to use the provider's applications running on a cloud infrastructure. The applications are accessible from various client devices through either a thin client interface, such as a web browser (e.g., web-based e-mail) or a program interface. The consumer does not manage or control the underlying cloud infrastructure including network, servers, operating systems, storage, or even individual application capabilities, with the possible exception of limited user-specific application configuration settings.

Platform as a Service (PaaS): The capability provided to the consumer is to deploy onto the cloud infrastructure consumer-created or acquired applications created using programming languages, libraries, services and tools supported by the provider. The consumer does not manage or control the underlying cloud infrastructure including networks, servers, operating systems or storage, but has control over the deployed applications and possibly configuration settings for the application-hosting environment.

Infrastructure as a Service (IaaS): The capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage and deployed applications; and possibly limited control of select networking components (e.g., host firewalls).

Deployment Models are as follows:

Private Cloud: The cloud infrastructure is provisioned for exclusive use by a single organization comprising multiple consumers (e.g., business units). It may be owned, managed and operated by the organization, a third party or some combination of them, and it may exist on or off premises.

Community Cloud: The cloud infrastructure is provisioned for exclusive use by a specific community of consumers from organizations that have shared concerns (e.g., mission, security requirements, policy and compliance considerations). It may be owned, managed and operated by one or more of the organizations in the community, a third party, or some combination of them, and it may exist on or off premises.

Public Cloud: The cloud infrastructure is provisioned for open use by the general public. It may be owned, managed and operated by a business, academic or government organization, or some combination of them. It exists on the premises of the cloud provider.

Hybrid Cloud: The cloud infrastructure is a composition of two or more distinct cloud infrastructures (private, community or public) that remain unique entities, but are bound together by standardized or proprietary technology that enables data and application portability (e.g., cloud bursting for load balancing between clouds).

Referring now to the Figures in detail, FIG. 1 illustrates a network system 100 configured in accordance with an embodiment of the present invention. Network system 100 includes a client device 101 connected to a cloud computing environment 102 via a network 103. Client device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of connecting to cloud computing environment 102 via network 103.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Cloud computing environment 102 is used to deliver computing as a service to client device 101 implementing the model discussed above. An embodiment of cloud computing environment 102 is discussed below in connection with FIG. 2.

Figure 2:
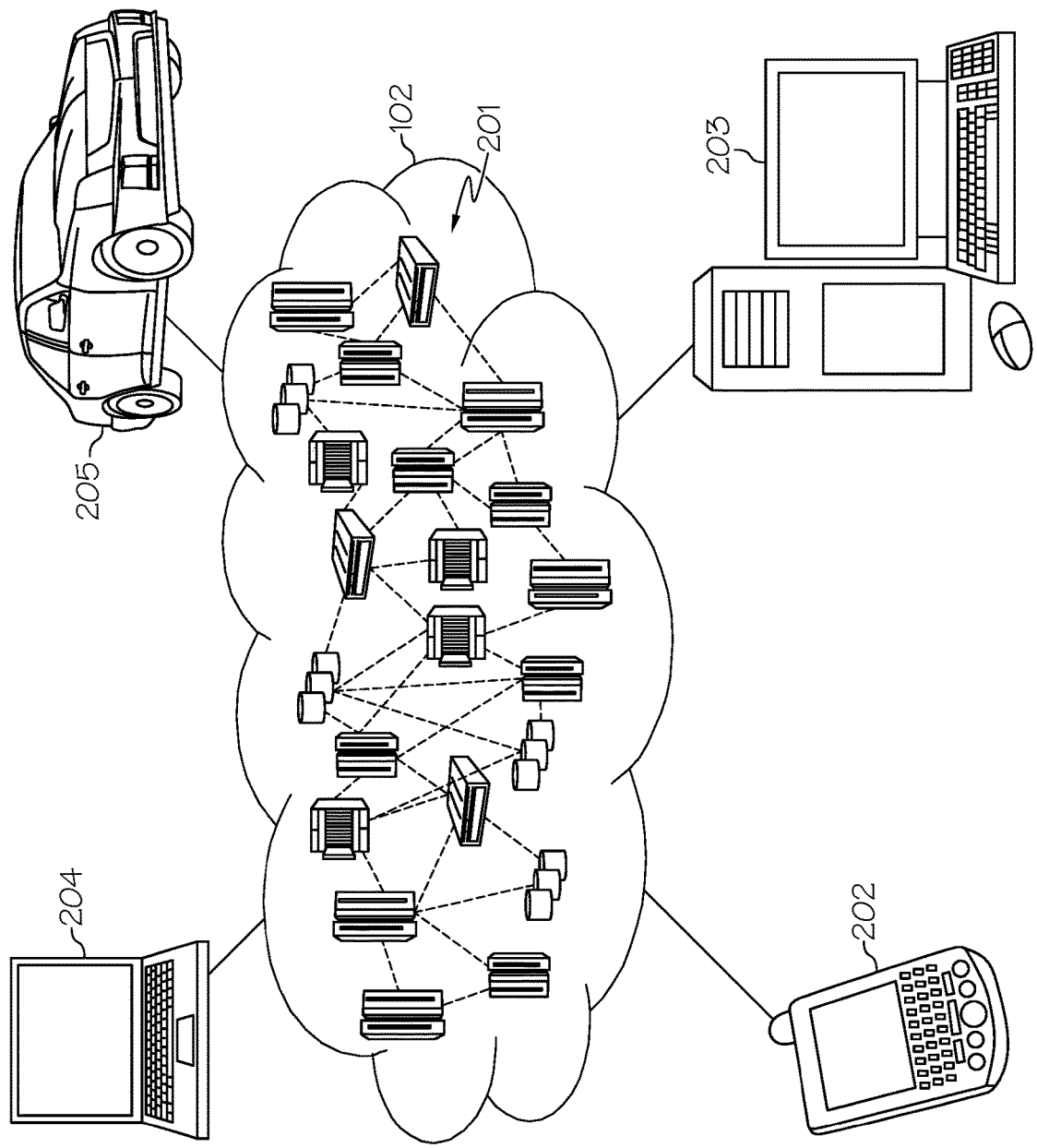
FIG. 2 illustrates a cloud computing environment in accordance with an embodiment of the present invention.

FIG. 2 illustrates cloud computing environment 102 in accordance with an embodiment of the present invention. As shown, cloud computing environment 102 includes one or more cloud computing nodes 201 (also referred to as "clusters") with which local computing devices used by cloud consumers, such as, for example, Personal Digital Assistant (PDA) or cellular telephone 202, desktop computer 203, laptop computer 204, and/or automobile computer system 205 may communicate. Nodes 201 may communicate with one another. They may be grouped (not shown) physically or virtually, in one or more networks, such as Private, Community, Public, or Hybrid clouds as described hereinabove, or a combination thereof. This allows cloud computing environment 102 to offer infrastructure, platforms and/or software as services for which a cloud consumer does not need to maintain resources on a local computing device. Cloud computing nodes 201 may include one or more racks of compute nodes (e.g., servers) that are managed by a server (referred to herein as the "administrative server") in cloud computing environment 102 as discussed below in greater detail in connection with FIG. 3.

It is understood that the types of computing devices 202, 203, 204, 205 shown in FIG. 2, which may represent client device 101 of FIG. 1, are intended to be illustrative and that cloud computing nodes 201 and cloud computing environment 102 can communicate with any type of computerized device over any type of network and/or network addressable connection (e.g., using a web browser). Program code located on one of nodes 201 may be stored on a computer recordable storage medium in one of nodes 201 and downloaded to computing devices 202, 203, 204, 205 over a network for use in these computing devices. For example, a server computer in computing nodes 201 may store program code on a computer readable storage medium on the server computer. The server computer may download the program code to computing device 202, 203, 204, 205 for use on the computing device.

Figure 3:
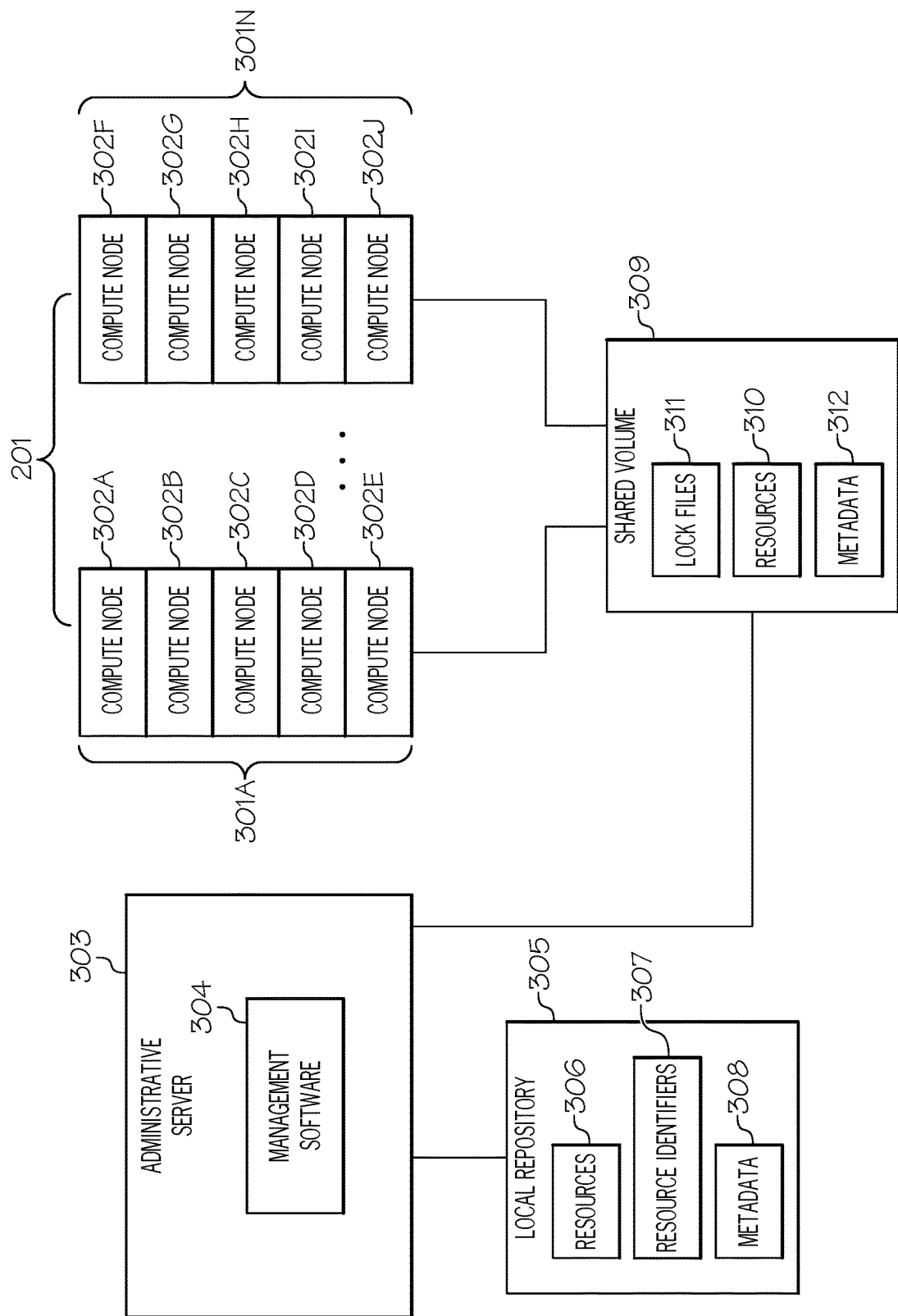
FIG. 3 illustrates a schematic of racks of compute nodes of a cloud computing node that are managed by an administrative server utilizing a shared file system to share resources among remote repositories in accordance with an embodiment of the present invention.

Referring now to FIG. 3, FIG. 3 illustrates a schematic of racks of compute nodes (e.g., servers) of a cloud computing node 201 that are managed by an administrative server utilizing a shared file system to share resources among remote repositories in accordance with an embodiment of the present invention.

As shown in FIG. 3, cloud computing node 201 may include racks 301A-301N of hardware components or "compute nodes," such as servers or other electronic devices. For example, rack 301A houses compute nodes 302A-302E and rack 301N houses compute nodes 302F-302J. Racks 301A-301N may collectively or individually be referred to as a racks 301 or rack 301, respectively. Compute nodes 302A-302J may collectively or individually be referred to as compute nodes 302 or compute node 302, respectively. An illustrative virtualization environment for compute node 302 is discussed further below in connection with FIG. 5. FIG. 3 is not to be limited in scope to the number of racks 301 or compute nodes 302 depicted. For example, cloud computing node 201 may be comprised of any number of racks 301 which may house any number of compute nodes 302. Furthermore, while FIG. 3 illustrates rack 301 housing compute nodes 302, rack 301 may house any type of computing component that is used by cloud computing node 201. Furthermore, while the following discusses compute node 302 being confined in a designated rack 301, it is noted for clarity that compute nodes 302 may be distributed across cloud computing environment 102 (FIGS. 1 and 2).

As further shown in FIG. 3, racks 301 are coupled to an administrative server 303 configured to provide data center-level functions. Administrative server 303 supports a module, referred to herein as the management software 304, that can be used to manage all the compute nodes 302 of cloud computing node 201, monitor system utilization, intelligently deploy images of data and optimize the operations of cloud computing environment 102. Management software 304 may further be configured to share resources among repositories, such as compute nodes 302, as discussed further below in connection with FIGS. 7A-7C, 8A-8D and 9. A description of the hardware configuration of administrative server 303 is provided further below in connection with FIG. 6.

In one embodiment, resources may be shared among repositories using a shared file system as depicted in FIG. 3. In such a system, a local repository 305 connected to administrative server 303 stores a copy of the resources 306 stored in the remote repositories (e.g., compute nodes 302), the resource identifiers 307 and the resource metadata 308. A resource identifier refers to an identifier, such as a string of characters, that identifies an associated resource. A resource metadata refers to data concerning the resource, such as the date the resource was created, the size of the resource, who created the resource, access rights, last modified, etc.

Furthermore, in such a shared file system, a shared volume 309 is used to store the resources 310 that are shared among the repositories. The resources are shared among the repositories utilizing lock files 311. Each lock file 311 is associated with a particular resource and stores the resource identifier associated with that resource. The resource identifier may be used as a pointer to the resource 310 as well as the resource's metadata 312 stored in shared volume 309. In one embodiment, the resource's metadata 308 stored in local repository 305 is a copy of the resource's metadata 312 stored in shared volume 309. A discussion of using lock file 311 to share resources among repositories is provided further below in connection with FIGS. 7A-7C.

In an alternative embodiment, resources are shared among repositories utilizing a peer-to-peer approach. In such an approach, resources are shared among repositories via the use of node locks and node graphs stored in local repository 305 as shown in FIG. 4.

Figure 4:
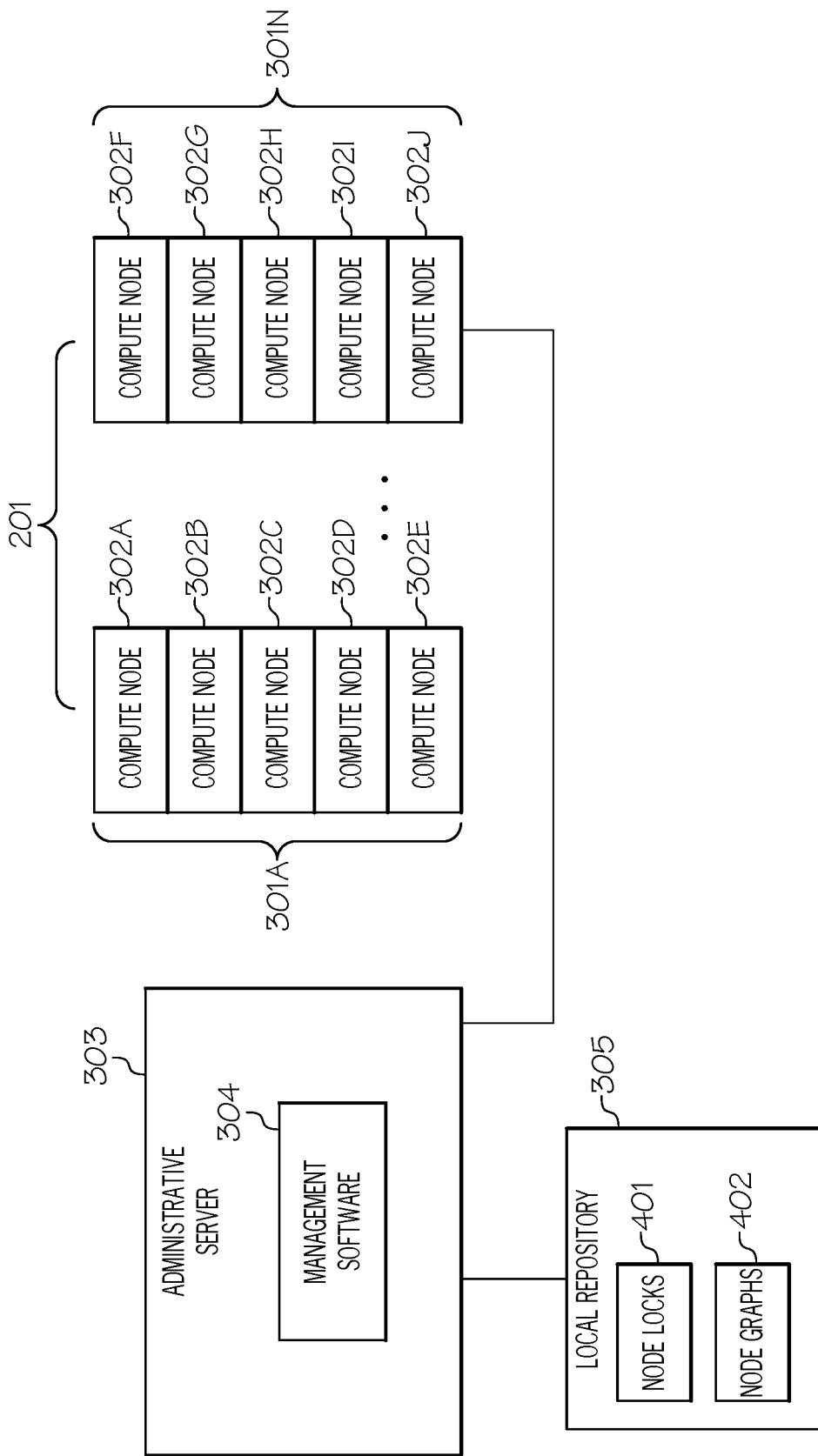
FIG. 4 illustrates a schematic of racks of compute nodes of a cloud computing node that are managed by an administrative server utilizing a peer-to-peer system to share resources among remote repositories in accordance with an embodiment of the present invention.

FIG. 4 illustrates a schematic of racks of compute nodes (e.g., servers) of a cloud computing node 201 that are managed by an administrative server utilizing a peer-to-peer system to share resources among remote repositories in accordance with an embodiment of the present invention.

Referring to FIG. 4, local repository 305 now stores node locks 401 as opposed to storing resources, resource identifiers and metadata. Node locks 401 are used to coordinate the create, read, update and delete operations to ensure integrity across the data repositories as discussed in further detail below in connection with FIGS. 8A-8D.

Local repository 305 also now stores node graphs 402 for the resources, where a node graph 402 is a hierarchical tree of nodes, where each of the nodes may contain data pertaining to the resource as discussed in further detail below in connection with FIGS. 8A-8D and 9.

Figure 5:
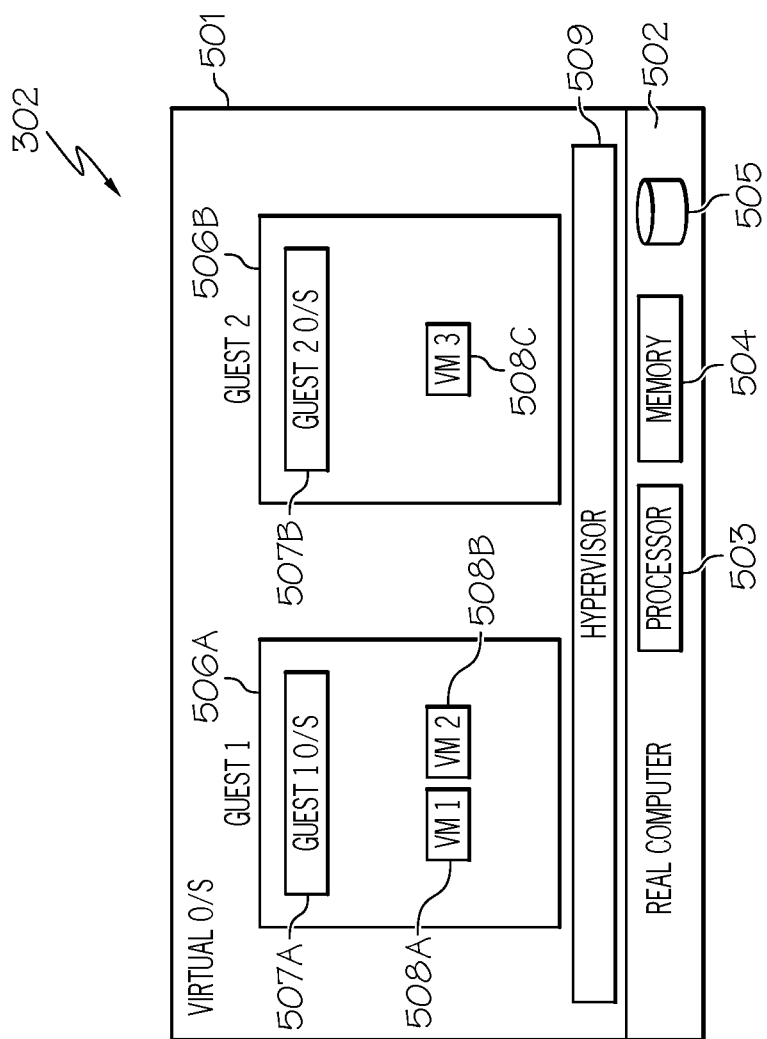
FIG. 5 illustrates a virtualization environment for a compute node in accordance with an embodiment of the present invention.

Referring now to FIG. 5, FIG. 5 illustrates a virtualization environment for compute node 302 (FIGS. 3 and 4) in accordance with an embodiment of the present invention. Compute node 302 includes a virtual operating system 501. Operating system 501 executes on a real or physical computer 502. Real computer 502 includes one or more processors 503, a memory 504 (also referred to herein as the host physical memory), one or more disk drives 505 and the like. Other components of real computer 502 are not discussed herein for the sake of brevity.

Virtual operating system 501 further includes user portions 506A-506B (identified as "Guest 1" and "Guest 2," respectively, in FIG. 5), referred to herein as "guests." Each guest 506A, 506B is capable of functioning as a separate system. That is, each guest 506A-506B can be independently reset, host a guest operating system 507A-507B, respectively, (identified as "Guest 1 O/S" and "Guest 2 O/S," respectively, in FIG. 5) and operate with different programs. An operating system or application program running in guest 506A, 506B appears to have access to a full and complete system, but in reality, only a portion of it is available. Guests 506A-506B may collectively or individually be referred to as guests 506 or guest 506, respectively. Guest operating systems 507A-507B may collectively or individually be referred to as guest operating systems 507 or guest operating system 507, respectively.

Each guest operating system 507A, 507B may host one or more virtual machine applications 508A-508C (identified as "VM 1," "VM 2" and "VM 3," respectively, in FIG. 5), such as Java™ virtual machines. For example, guest operating system 507A hosts virtual machine applications 508A-508B. Guest operating system 507B hosts virtual machine application 508C. Virtual machines 508A-508C may collectively or individually be referred to as virtual machines 508 or virtual machine 508, respectively.

Virtual operating system 501 further includes a common base portion 509, referred to herein as a hypervisor. Hypervisor 509 may be implemented in microcode running on processor 503 or it may be implemented in software as part of virtual operating system 501. Hypervisor 509 is configured to manage and enable guests 506 to run on a single host.

As discussed above, virtual operating system 501 and its components execute on physical or real computer 502. These software components may be loaded into memory 504 for execution by processor 503.

The virtualization environment for compute node 302 is not to be limited in scope to the elements depicted in FIG. 5. The virtualization environment for compute node 302 may include other components that were not discussed herein for the sake of brevity.

Figure 6:
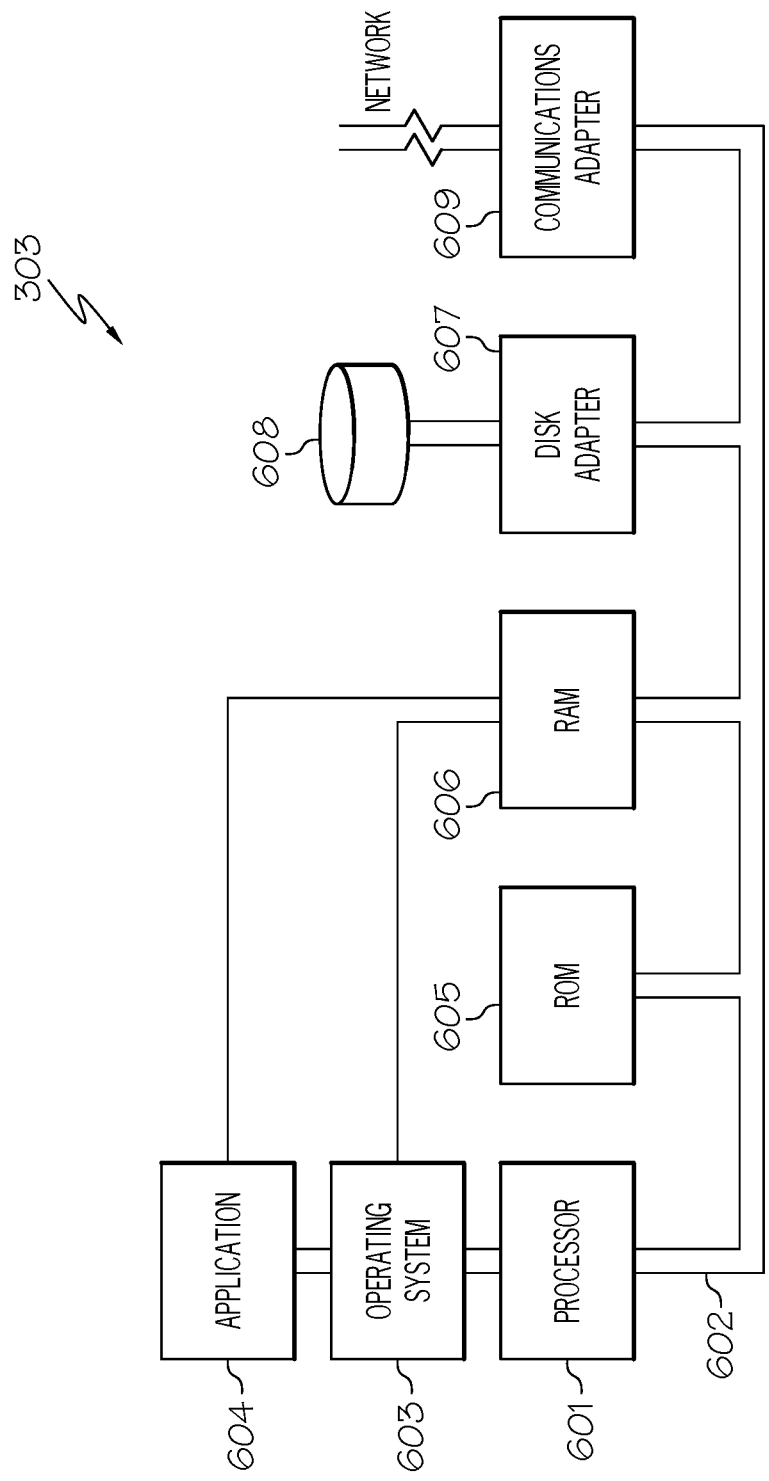
FIG. 6 illustrates a hardware configuration of an administrative server configured in accordance with an embodiment of the present invention.

Referring now to FIG. 6, FIG. 6 illustrates a hardware configuration of administrative server 303 (FIGS. 3 and 4) which is representative of a hardware environment for practicing the present invention. Administrative server 303 has a processor 601 coupled to various other components by system bus 602. An operating system 603 runs on processor 601 and provides control and coordinates the functions of the various components of FIG. 6. An application 604 in accordance with the principles of the present invention runs in conjunction with operating system 603 and provides calls to operating system 603 where the calls implement the various functions or services to be performed by application 604. Application 604 may include, for example, a program (e.g., management software 304 of FIGS. 3 and 4) for sharing resources among repositories as discussed further below in connection with FIGS. 7A-7C, 8A-8D and 9.

Referring again to FIG. 6, read-only memory ("ROM") 605 is coupled to system bus 602 and includes a basic input/output system ("BIOS") that controls certain basic functions of administrative server 303. Random access memory ("RAM") 606 and disk adapter 607 are also coupled to system bus 602. It should be noted that software components including operating system 603 and application 604 may be loaded into RAM 606, which may be administrative server's 303 main memory for execution. Disk adapter 607 may be an integrated drive electronics ("IDE") adapter that communicates with a disk unit 608, e.g., disk drive. It is noted that the program for sharing resources among repositories, as discussed further below in connection with FIGS. 7A-7C, 8A-8D and 9, may reside in disk unit 608 or in application 604.

Administrative server 303 may further include a communications adapter 609 coupled to bus 602. Communications adapter 609 interconnects bus 602 with an outside network (e.g., network 103 of FIG. 1).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, when resources are shared across repositories, the resource metadata is required to be bundled with the resource. Hence, the resource is required to be shared completely again when only the metadata is updated. Furthermore, if the metadata is stored alongside the resource as a second resource, then there is a chance that the two resources will become out of sync with each other, especially in a system where resources may be updated frequently, such as in a cloud computing environment. Content versioning systems that attempt to keep track of the versions of the resources may be viewed as an alternative. However, such systems require a central repository and a significant amount of resources (e.g., physical and virtual resources, such as processing usage, memory usage, storage usage) for tracking the versions of resources being shared among the repositories. Unfortunately, there is not currently a means for sharing resources among repositories utilizing few resources without the possibility of the resource (e.g., data) and resource metadata becoming out of sync.

The principles of the present invention provide a means for sharing resources among repositories utilizing few resources (e.g., physical and virtual resources, such as processing usage, memory usage, storage usage) without the resource and resource metadata becoming out of sync via the use of a lock file in a shared file system or via a node graph 402 (FIG. 4) in a peer-to-peer system as discussed below in connection with FIGS. 7A-7C, 8A-8D and 9.

Figure 7A:
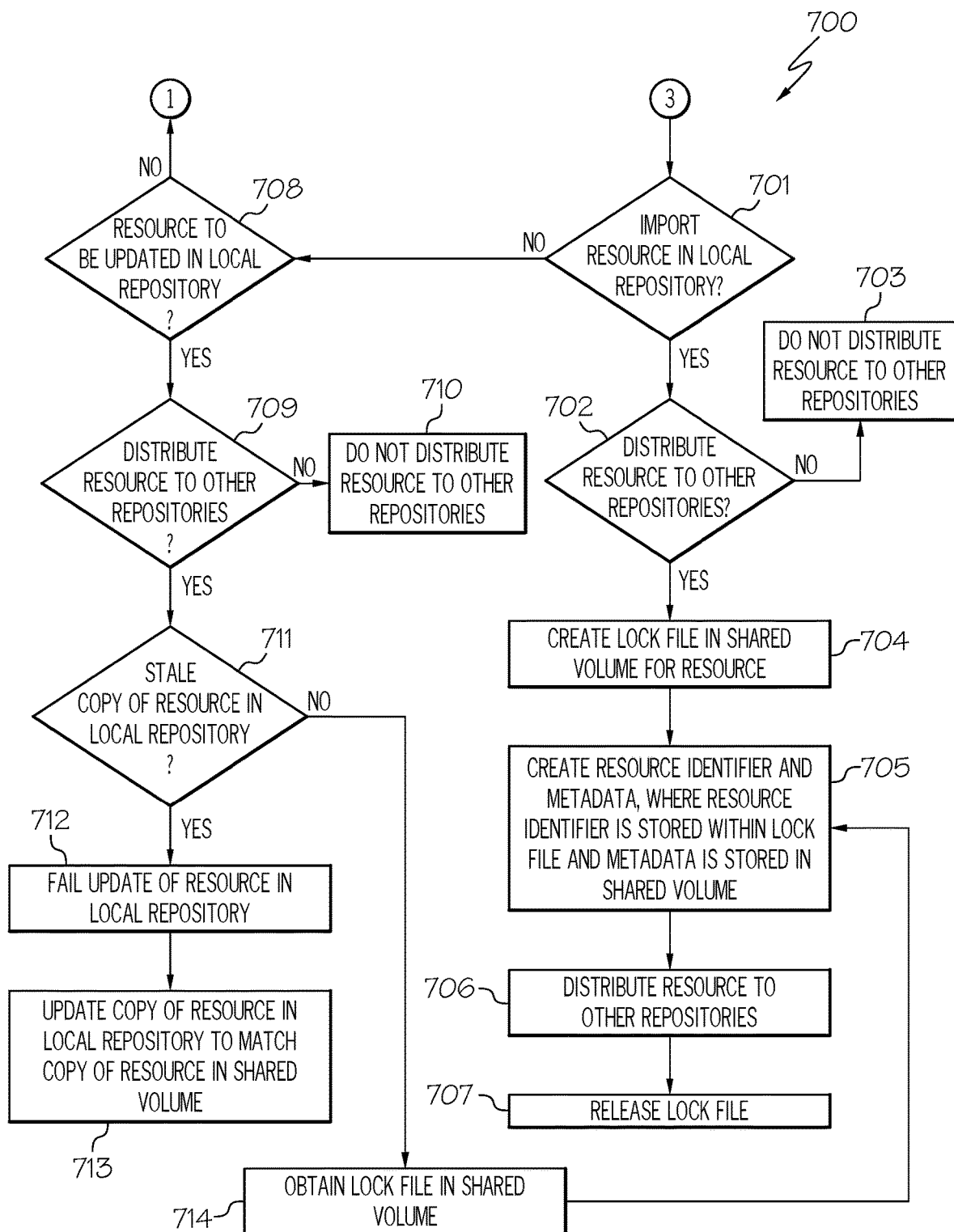
FIGS. 7A-7C are a flowchart of a method for sharing resources among remote repositories utilizing a lock file in a shared file system in accordance with an embodiment of the present invention.
Figure 7B:
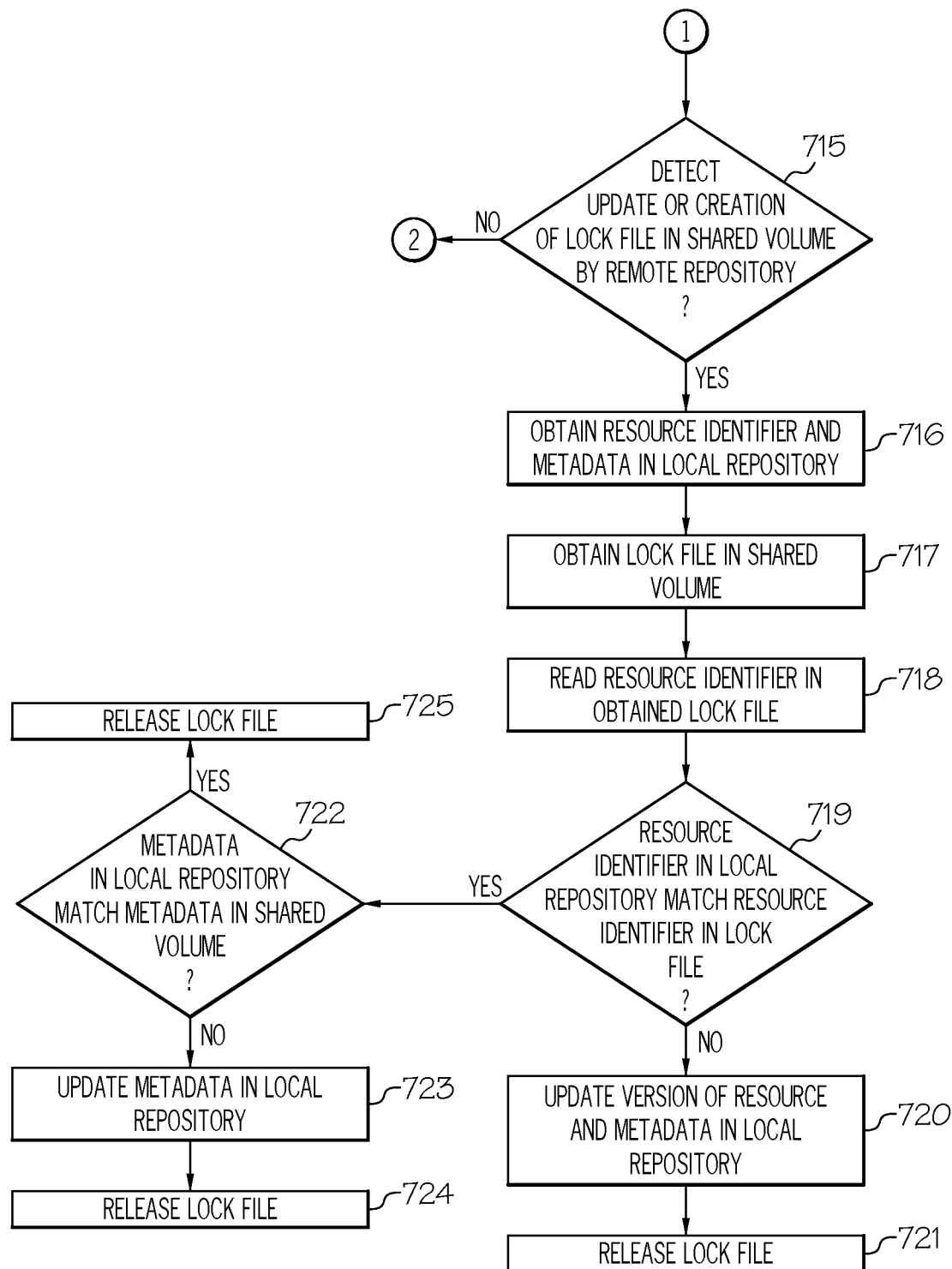
Figure 7C:
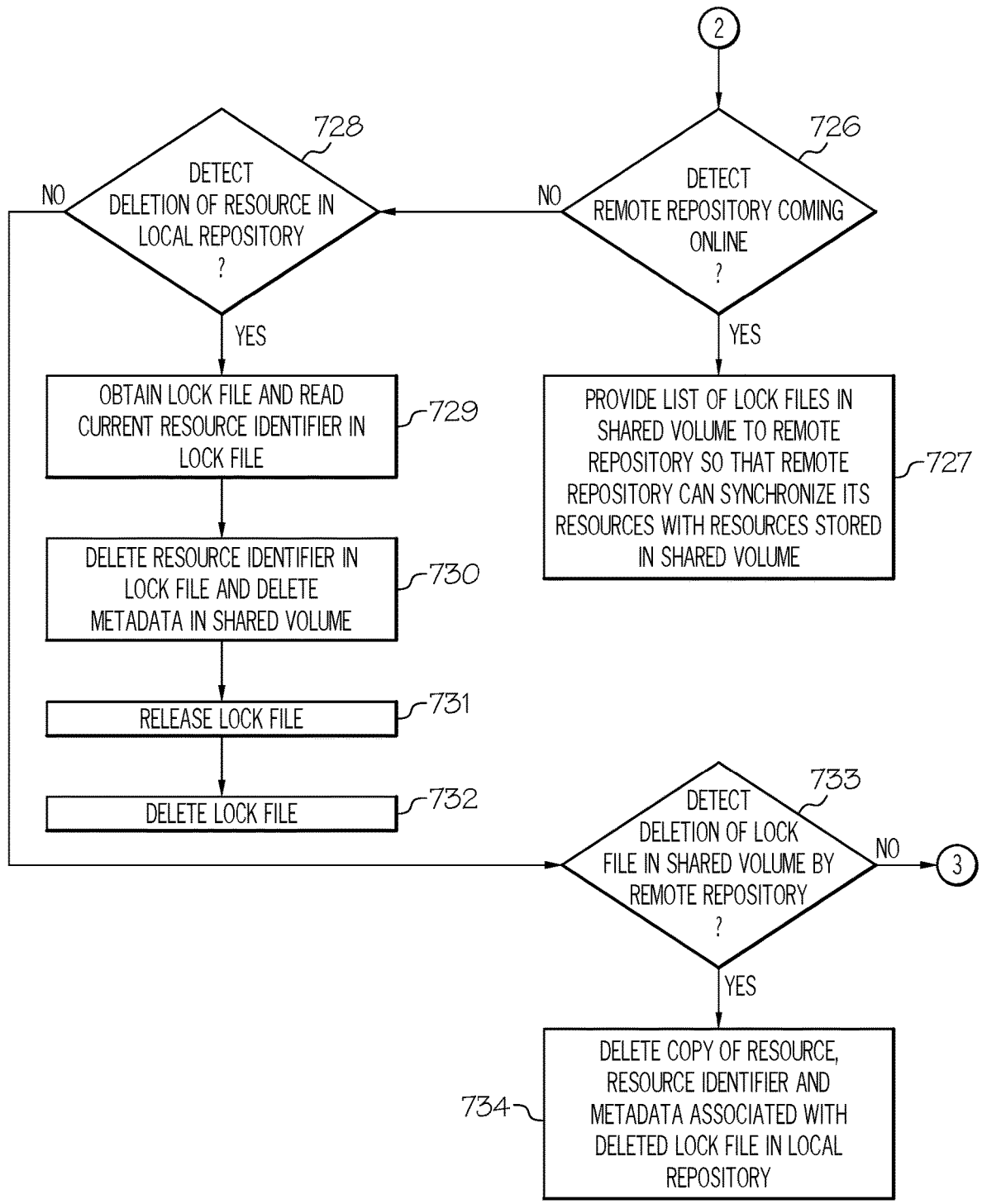

FIGS. 7A-7C are a flowchart of a method for sharing resources among remote repositories utilizing a lock file in a shared file system. FIGS. 8A-8D are a flowchart of a method for sharing resources among remote repositories utilizing node graph 402 in a peer-to-peer system. FIG. 9 illustrates an exemplary node graph 402 for a resource.

As discussed above, FIGS. 7A-7C are a flowchart of a method for sharing resources among remote repositories utilizing a lock file in a shared file system in accordance with an embodiment of the present invention.

Referring to FIG. 7A, in conjunction with FIGS. 1-3 and 5-6, in step 701, administrative server 303 determines if a resource (e.g., data) is imported in local repository 305, such as resource 306. If a resource is imported in local repository 305, then, in step 702, administrative server 303 determines if the imported resource is to be distributed to other repositories (e.g., compute nodes 302B, 302C), such as repositories that belong to a collection of repositories storing similar data (e.g., financial information of an entity).

If the imported resource is not to be distributed to other repositories, then, in step 703, administrative server 303 does not distribute the imported resource to other repositories.

If, however, the imported resource is to be distributed to other repositories, then, in step 704, administrative server 303 creates a lock file 311 in shared volume 309 for the resource. A "lock file 311," as used herein, refers to a file that is associated with a particular resource and stores the resource identifier associated with that resource. Lock file 311 is used as a means for restricting access to the resource by allowing only one user or process access to the resource at any specific time. In this manner, administrative server 303 is able to distribute the imported resource to other repositories without the resource being able to be modified until after the resource has been distributed.

In step 705, administrative server 303 creates a resource identifier and metadata 312 for the resource, where the resource identifier is stored within lock file 311 and metadata 312 is stored within shared volume 309. A resource identifier refers to an identifier, such as a string of characters, that identifies an associated resource. The resource identifier may be used as a pointer to the resource 310 and the resource's metadata 312 stored in shared volume 309. The resource's metadata 312 refers to data concerning resource 310, such as the date the resource was created, the size of the resource, who created the resource, access rights, last modified, etc.

In step 706, administrative server 303 distributes the imported resource to other repositories (e.g., compute nodes 302B, 302C).

In step 707, administrative server 303 releases lock file 311 thereby permitting the modification of the imported resource.

Referring to step 701, if, however, a resource (e.g., data) is not imported in local repository 305, then, in step 708, a determination is made by administrative server 303 as to whether a resource 306 stored in local repository 305 is to be updated.

If a resource 306 stored in local repository 305 is to be updated, then, in step 709, administrative server 303 determines if resource 306 to be updated is to be distributed to other repositories (e.g., compute nodes 302B, 302C), such as repositories that store the same resource. In one embodiment, administrative server 303 may store a data structure (e.g., table), such as in a memory or storage unit (e.g., memory 605, disk unit 608), containing a listing of repositories storing a particular resource thereby allowing administrative server 303 to determine the other repositories storing the resource that was updated.

If resource 306 to be updated is not to be distributed to other repositories, then, in step 710, administrative server 303 does not distribute the updated resource to other repositories.

If, however, resource 306 to be updated is to be distributed to other repositories, then, in step 711, a determination is made by administrative server 303 as to whether resource 306 to be updated in local repository 305 is a stale copy. In one embodiment, administrative server 303 determines whether resource 306 in local repository 305 is a stale copy based on comparing resource 306 with its corresponding resource 310 stored in shared volume 309. As discussed above, resources 306 stored in local repository 305 are copies of resources 310 stored in shared volume 309. If there is a difference between resource 310 stored in shared volume 309 with its copy (resource 306), then resource 306 is said to be a stale copy of resource 310.

If resource 306 to be updated in local repository 305 is a stale copy, then, in step 712, administrative server 303 fails the update of resource 306 in local repository 305. In step 713, administrative server 303 updates the copy of resource 306 in local repository 305 to match the copy of the resource 310 in shared volume 309.

If, however, resource 306 to be updated in local repository 305 is not a stale copy, then, in step 714, administrative server 303 obtains lock file 311 associated with the resource to be updated in shared volume 309. Administrative server 303 then creates a resource identifier and metadata 312 for the resource to be updated, where the resource identifier is stored within lock file 311 and metadata 312 is stored within shared volume 309 in step 705.

Referring to step 708, if, however, a resource 306 stored in local repository 305 is not to be updated, then, referring to FIG. 7B, in conjunction with FIGS. 1-3 and 5-6, in step 715, a determination is made by administrative server 303 as to whether it detected an update or creation of lock file 311 in shared volume 309 by a remote repository (e.g., compute node 302).

If administrative server 303 detected an update or creation of lock file 311 in shared volume 309 by a remote repository, then, in step 716, administrative server 303 obtains the resource identifier 307 and metadata 308 in local repository 305 for the resource associated with the updated or created lock file 311.

In step 717, administrative server 303 obtains the updated or created lock file 311 in shared volume 309.

In step 718, administrative server 303 reads the resource identifier stored in the obtained lock file 311.

In step 719, a determination is made by administrative server 303 as to whether the resource identifier 307 in local repository 305 matches the resource identifier in lock file 311. If resource identifier 307 in local repository 305 does not match the resource identifier in lock file 311, then, in step 720, administrative server 303 updates the version of the resource 306 and metadata 308 in local repository 305. In this manner, a copy of the resource 306 stored in local repository 305 will be up-to-date (i.e., resource 306 will be an up-to-date copy of resource 310 stored in shared volume 309). Furthermore, a copy of the metadata 308 stored in local repository 305 will be up-to-date (i.e., metadata 308 will be an up-to-date copy of metadata 312 stored in shared volume 309). In step 721, administrative server 303 releases lock file 311.

If, however, resource identifier 307 in local repository 305 matches the resource identifier in lock file 311, then, in step 722, a determination is made by administrative server 303 as to whether the metadata 308 in local repository 305 matches the metadata stored in shared volume 309.

If the metadata 308 stored in local repository 305 does not match the metadata stored in shared volume 309, then, in step 723, administrative server 303 updates metadata 308 in local repository 305 thereby ensuring metadata 308 is a correct copy of the metadata 312 stored in shared volume 309. In step 724, administrative server 303 releases lock file 311.

If, however, metadata 308 stored in local repository 305 matches the metadata stored in shared volume 309, then, in step 725, administrative server 303 releases lock file 311.

Referring to step 715, if, however, administrative server 303 did not detect an update or creation of lock file 311 in shared volume 309 by a remote repository, then, referring to FIG. 7C, in conjunction with FIGS. 1-3 and 5-6, in step 726, a determination is made by administrative server 303 as to whether it detected a remote repository (e.g., compute node 302) coming online.

If administrative server 303 detected a remote repository coming online, then, in step 727, administrative server 303 provides a list of lock files 311 in shared volume 309 to the remote repository so that the remote repository can synchronize its resources with resources 310 stored in shared volume 309.

If, however, administrative server 303 did not detect a remote repository coming online, then, in step 728, a determination is made by administrative server 303 as to whether it detected a deletion of a resource 306 in local repository 305.

If administrative server 303 detected a deletion of a resource 306 in local repository 305, then, in step 729, administrative server 303 obtains the lock file 311 associated with the resource 306 deleted in local repository 305 and reads the current resource identifier from lock file 311.

In step 730, administrative server 303 deletes the resource identifier in lock file 311 and deletes metadata 312 in shared volume 309. In one embodiment, the resource identifier obtained in step 729 is used to identify the appropriate metadata 312 to be deleted.

In step 731, administrative server 303 releases lock file 311 and then deletes lock file 311 in step 732.

If, however, administrative server 303 did not detect a deletion of a resource 306 in local repository 305, then, in step 733, a determination is made by administrative server 303 as to whether it detected a deletion of a lock file 311 in shared volume 309 by a remote repository (e.g., compute node 302).

If administrative server 303 detected a deletion of a lock file 311 in shared volume 309 by a remote repository, then, in step 734, administrative server 303 deletes a copy of the resource 306, resource identifier 307 and metadata 308 associated with the deleted lock file 311 in local repository 305.

If, however, administrative server 303 did not detect a deletion of a lock file 311 in shared volume 309 by a remote repository, then administrative server 303 determines if a resource (e.g., data) is imported in local repository 305 in step 701.

In this manner, resources are shared among repositories utilizing few resources (e.g., physical and virtual resources, such as processing usage, memory usage, storage usage) without the resource and resource metadata becoming out of sync via the use of a lock file in a shared file system.

Alternatively, resources may be shared among repositories without the use of a shared file system, such as via a peer-to-peer system, as discussed below in connection with FIGS. 8A-8D and 9.

As discussed above, FIGS. 8A-8D are a flowchart of a method 800 for sharing resources among remote repositories utilizing a node graph 402 (FIG. 4) in a peer-to-peer system in accordance with an embodiment of the present invention.

Figure 8A:
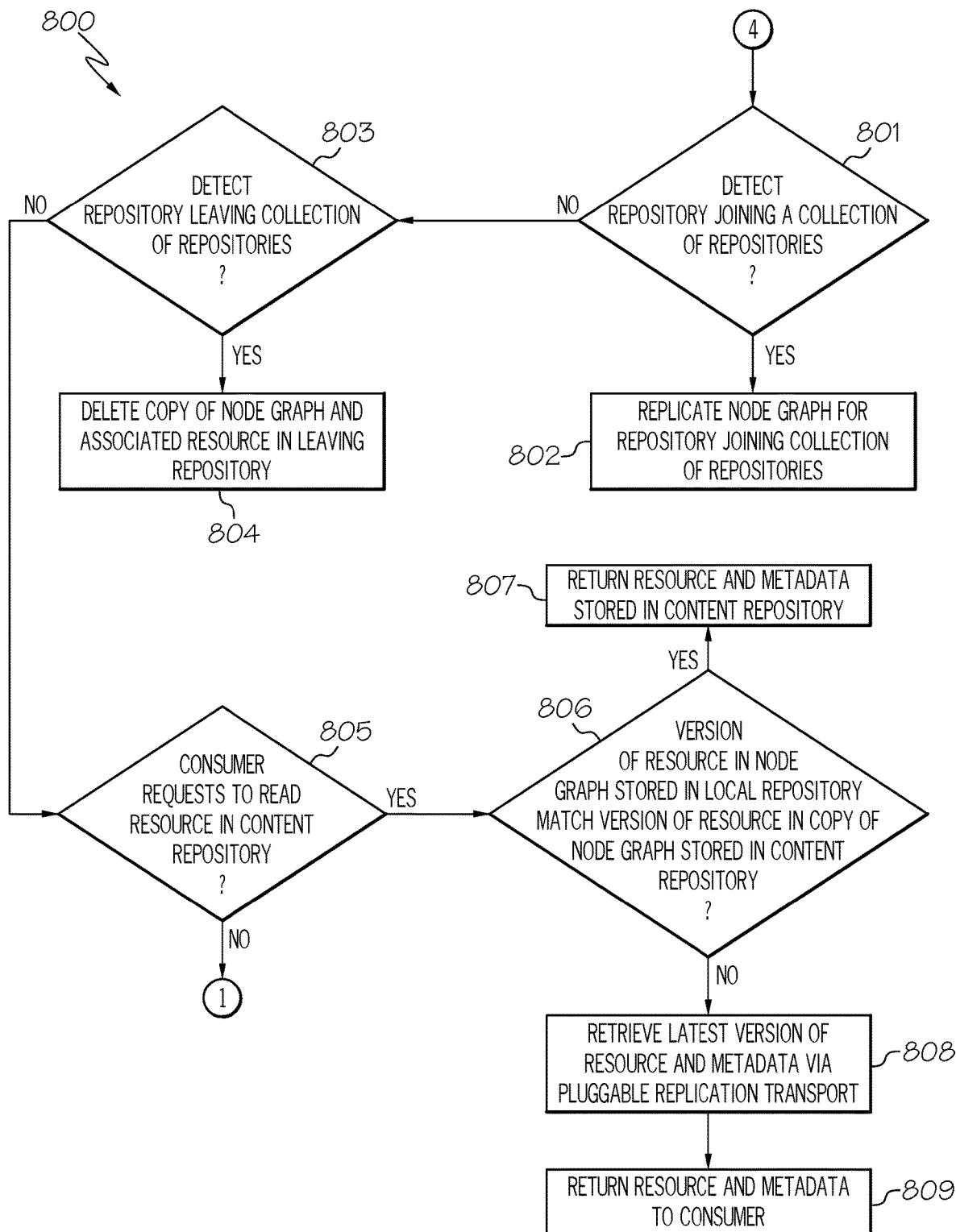
FIGS. 8A-8D are a flowchart of a method 800 for sharing resources among remote repositories utilizing a node graph in a peer-to-peer system in accordance with an embodiment of the present invention.
Figure 9:
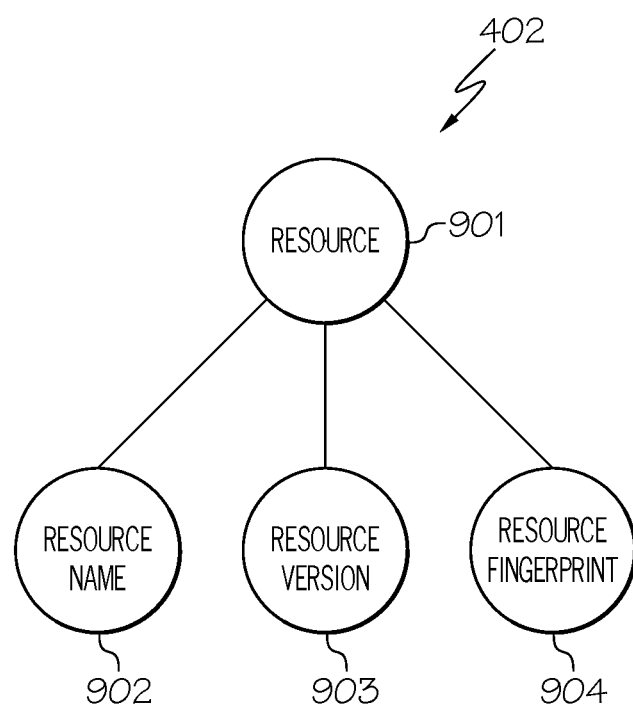
FIG. 9 illustrates an exemplary node graph for a resource in accordance with an embodiment of the present invention.

Referring to FIG. 8A, in conjunction with FIGS. 1-2 and 4-6, in step 801, a determination is made by administrative server 303 as to whether it detects a repository (e.g., compute node 302A) joining a collection of repositories. A "collection" of repositories refers to repositories that are part of a peer-to-peer system in which resources are shared amongst each other.

If a repository is joining a collection of repositories, then, in step 802, administrative server 303 replicates node graph 402 (replicate node graph 402 stored in local repository 305) for the repository joining the collection of repositories. A "node graph 402," as used herein, refers to a hierarchical tree of nodes, where the nodes may have data associated with it, such as a resource name, a resource version and a resource fingerprint as discussed below in connection with FIG. 9.

FIG. 9 illustrates an exemplary node graph 402 for a resource in accordance with an embodiment of the present invention.

Referring to FIG. 9, node graph 402 may include a root node 901, such as a node designated for a particular resource, that contains child nodes, such as nodes 902-904, that contain data pertaining to the resource. For example, node 902 may contain the resource name. Node 903 contains the version of the resource. Node 904 contains the fingerprint of the resource. A "fingerprint," as used herein, is a data item, such as a bit string, that uniquely identifiers the original data of the resource. In one embodiment, the fingerprint is a much shorter bit string in comparison to the size of the data item of the resource.

Node graph 402 of FIG. 9 is not to be limited in scope to the depicted number of nodes or to the depicted number of levels of node graph 402. For example, node graph 402 may include any number of child nodes, where each child node may include any number of further child nodes.

In one embodiment, node graph 402 is associated with a particular resource and is stored in local repository 305. In one embodiment, a copy of node graph 402 is stored in the remote repository (e.g., compute node 302) storing the resource, such as in the memory or storage unit of the remote repository (e.g., memory 504, disk unit 505). As will be discussed in further detail below, node graph 402 is used to enable sharing of a resource among repositories in a peer-to-peer system.

Returning to FIG. 8A, in conjunction with FIGS. 1-2, 4-6 and 9, if, however, a repository is not joining a collection of repositories, then, in step 803, a determination is made by administrative server 303 as to whether it detects a repository (e.g., compute node 302A) leaving the collection of repositories.

If administrative server 303 detects a repository leaving the collection of repositories, then, in step 804, administrative server 303 deletes a copy of node graph 402 and the associated resource in the leaving repository.

If, however, administrative server 303 does not detect a repository leaving the collection of repositories, then, in step 805, administrative server 303 determines if the consumer (i.e., the user receiving the services provided by the cloud computing environment) requests to read a resource in a content repository (e.g., compute node 302B).

If the consumer requests to read a resource in a content repository, then, in step 806, a determination is made by administrative server 303 as to whether a version of the resource 903 in node graph 402 stored in local repository 305 matches the version of the resource 903 in the copy of node graph 402 stored in the content repository.

If the version of the resource 903 in node graph 402 stored in local repository 305 matches the version of the resource 902 in the copy of node graph 402 stored in the content repository, then, in step 807, administrative server 303 returns the requested resource and the metadata for the resource stored in the content repository to the consumer.

If, however, the version of the resource 903 in node graph 402 stored in local repository 305 does not match the version of the resource 903 in the copy of node graph 402 stored in the content repository, then, in step 808, administrative server 303 retrieves the latest version of the resource and metadata from the content repository (e.g., compute node 302G) containing the latest version via a pluggable replication transport (e.g., Hypertext Transfer Protocol (HTTP), Session Control Protocol (SCP)). In one embodiment, administrative server 303 may store a data structure (e.g., table), such as in a memory or storage unit (e.g., memory 605, disk unit 608), containing a listing of repositories storing a particular resource thereby allowing administrative server 303 to determine the repositories storing the resource in question.

In step 809, administrative server 303 returns the retrieved resource and the metadata for the resource to the consumer.

Figure 8B:
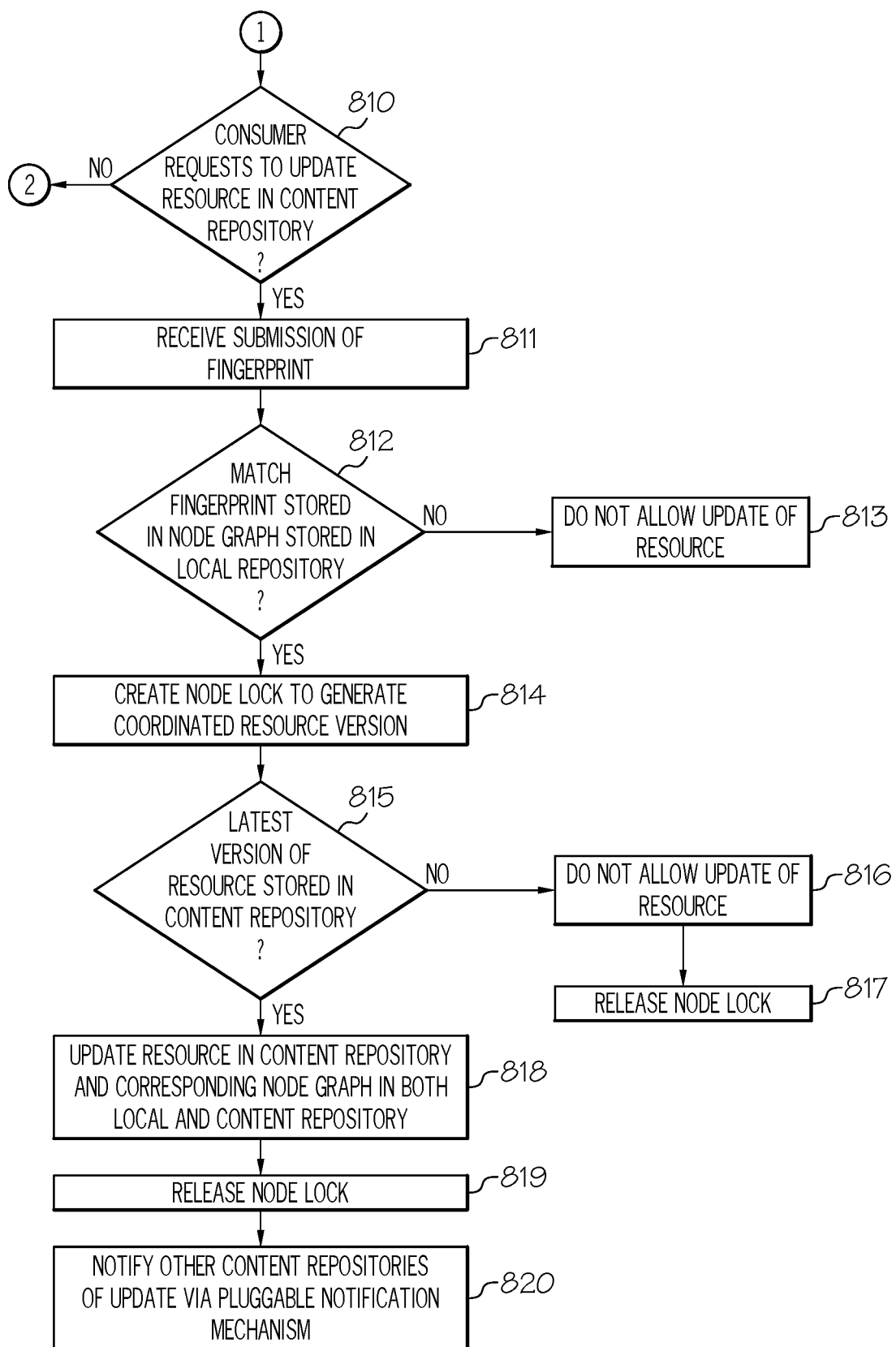

Referring to step 805, if, however, the consumer did not request to read a resource in a content repository, then, referring to FIG. 8B, in conjunction with FIGS. 1-2, 4-6 and 9, in step 810, a determination is made by administrative server 303 as to whether the consumer requests to update the resource in a content repository (e.g., compute node 302B).

If the consumer requests to update the resource in a content repository, then, in step 811, administrative server 303 receives a submission of a fingerprint for the resource to be updated from the producer (i.e., the producer that produced the resource to be updated). In one embodiment, administrative server 303 may request the producer to provide such a fingerprint which will be used to determine if the correct resource is to be updated. In one embodiment, administrative server 303 may store a data structure (e.g., table), such as in a memory or storage unit (e.g., memory 605, disk unit 608), containing a listing of the producers that produced the resources stored in the remote repositories.

In step 812, a determination is made by administrative server 303 as to whether the received fingerprint matches resource fingerprint 904 in node graph 402 stored in local repository 305 for the resource to be updated.

If the received fingerprint does not match resource fingerprint 904 in node graph 402 stored in local repository 305, then, in step 813, administrative server 303 does not allow the update of the resource.

If, however, the received fingerprint matches resource fingerprint 904 in node graph 402 stored in local repository 305, then, in step 814, administrative server 303 creates a node lock 401 to generate a coordinated resource version. A node lock 401 is used to coordinate the create, read, update and delete operations to ensure integrity across the data repositories. A "node lock," as used herein, is a means for restricting access to a resource, including the node graph 402 of the resource, by allowing only one user or process access to the resource, including the node graph 402 of the resource, at any specific time.

In step 815, a determination is made by administrative server 303 as to whether the latest version of the resource (the resource to be updated) is stored in the content repository (e.g., compute node 302B). In one embodiment, the coordinated resource version generated in step 814 is used to determine if the latest version of the resource is stored in the content repository. If the coordinated resource version generated in step 814 matches the version of the resource stored in the content repository (i.e., matches resource version 903 in the copy of node graph 402 stored in the content repository), then the content repository is said to be storing the latest version of the resource. If, however, the coordinated resource version generated in step 814 does not match the version of the resource stored in the content repository (i.e., does not match resource version 903 in the copy of node graph 402 stored in the content repository), then the content repository is said to not be storing the latest version of the resource.

If the content repository is not storing the latest version of the resource to be updated, then, in step 816, administrative server 303 does not allow the update of the resource in the content repository.

In step 817, administrative server 303 releases node lock 401.

If, however, the content repository is storing the latest version of the resource to be updated, then, in step 818, administrative server 303 updates the resource in the content repository and the corresponding node graph 402 stored in both the content repository and local repository 305.

In step 819, administrative server 303 releases node lock 401.

In step 820, administrative server 303 notifies the other content repositories (e.g., compute nodes 302 C-302E) in the collection of repositories of the update via a pluggable replication transport (e.g., HTTP, SCP).

Figure 8C:
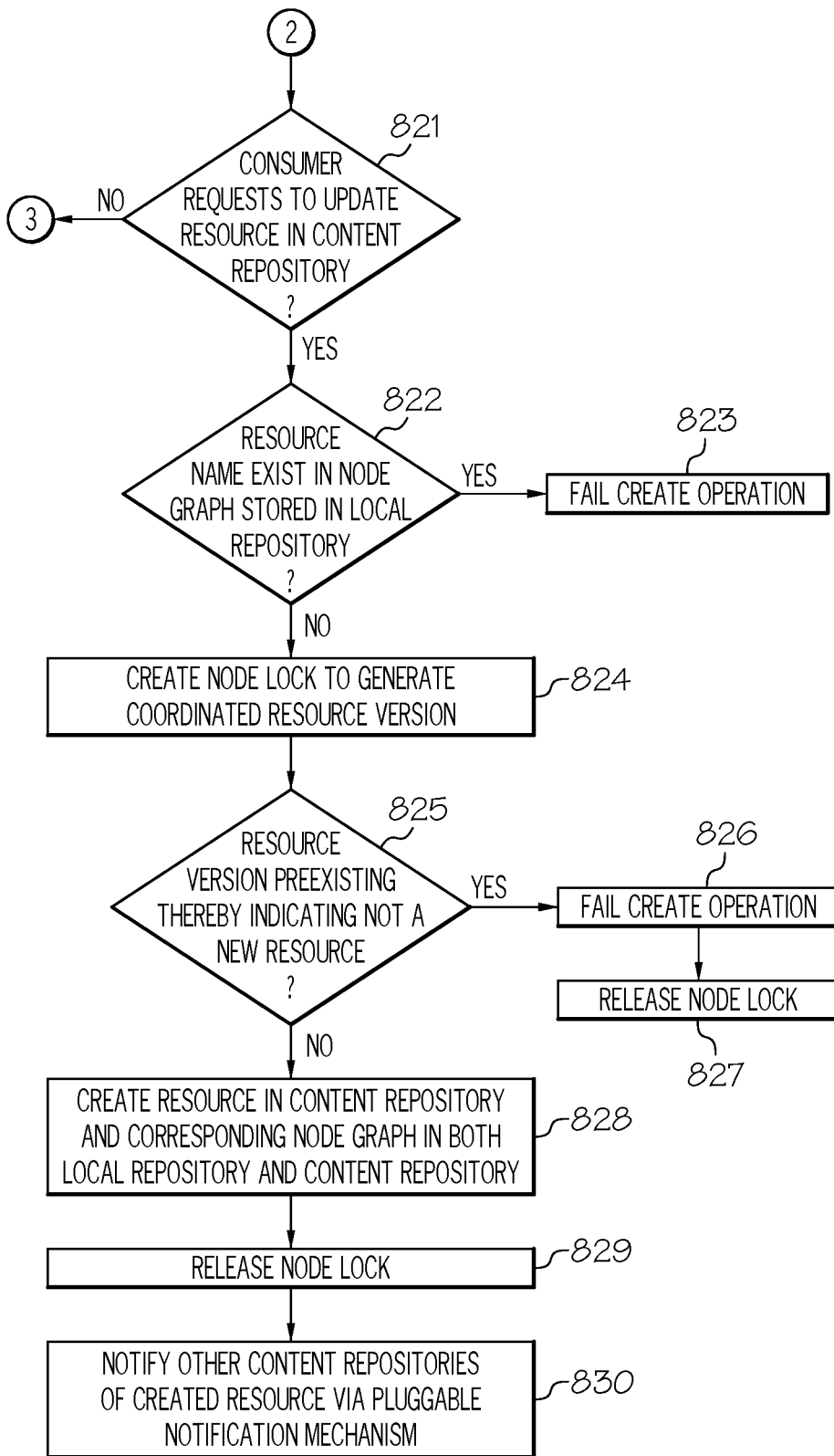

Referring to step 810, if, however, the consumer did not request to update the resource in a content repository, then, referring to FIG. 8C, in conjunction with FIGS. 1-2, 4-6 and 9, in step 821, a determination is made by administrative server 303 as to whether the consumer requests to create a resource in a content repository (e.g., compute node 302A).

If the consumer requests to create a resource in the content repository, then, in step 822, administrative server 303 determines if the resource name provided by the consumer in the request to create a resource exists in node graph 402 stored in local repository 305 for that resource.

If the resource name exists in node graph 402 for that resource, then, in step 823, administrative server 303 fails the create operation since the resource has already been created (i.e., it is not a new resource).

If, however, the resource name does not exist in node graph 402 for that resource, then, in step 824, administrative server 303 creates a node lock 401 to generate a coordinate resource version.

In step 825, a determination is made by administrative server 303 as to whether the coordinated resource version is preexisting, such as preexisting in resource version 903 of node graph 402 stored in local repository 305, thereby indicating that the resource to be created is not a new resource.

If the coordinated resource version is preexisting, then, in step 826, administrative server 303 fails the create operation.

In step 827, administrative server 303 releases node lock 401.

If, however, the coordinated resource version is not preexisting, then, in step 828, administrative server 303 creates the resource in the content repository and the corresponding node graph 402 in both the content repository and local repository 305.

In step 829, administrative server 303 releases node lock 401.

In step 830, administrative server 303 notifies the other content repositories (e.g., compute nodes 302C-302E) in the collection of repositories of the created resource via a pluggable replication transport (e.g., HTTP, SCP).

Figure 8D:
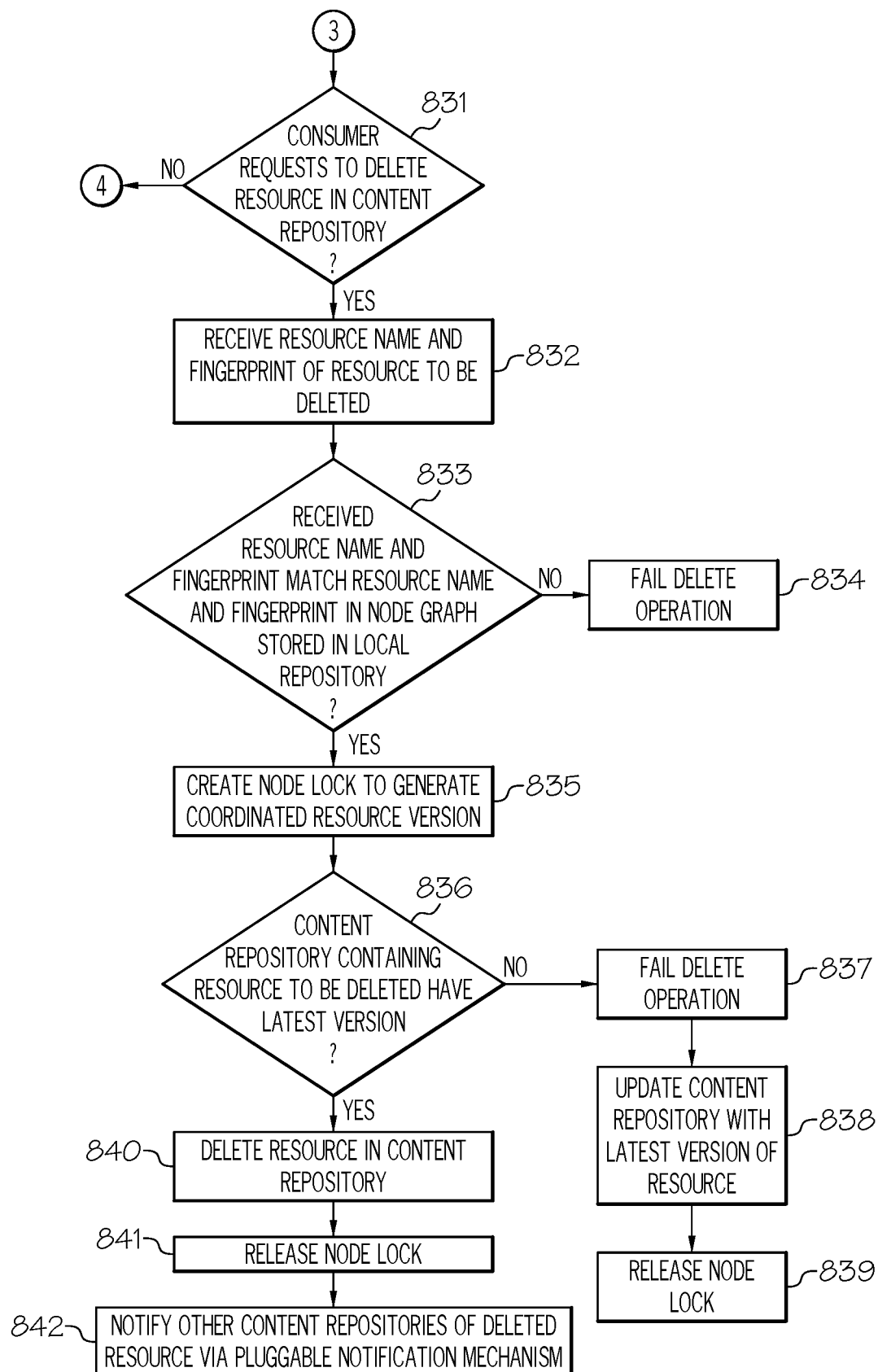

Referring to step 821, if, however, the consumer did not request to create a resource in a content repository, then, referring to FIG. 8D, in conjunction with FIGS. 1-2, 4-6 and 9, in step 831, a determination is made by administrative server 303 as to whether the consumer requests to delete a resource in a content repository (e.g., compute node 302A).

If the consumer requests to delete a resource in the content repository, then, in step 832, administrative server 303 receives the resource name and fingerprint of the resource to be deleted from the consumer.

In step 833, a determination is made by administrative server 303 as to whether the received resource name and fingerprint matches resource name 902 and resource fingerprint 904 in node graph 402 stored in local repository 305.

If the received resource name and fingerprint do not match resource name 902 and resource fingerprint 904 in node graph 402 stored in local repository 305, then, in step 834, administrative server 303 fails the delete operation.

If, however, the received resource name and fingerprint matches resource name 902 and resource fingerprint 904 in node graph 402 stored in local repository 305, then, in step 835, administrative server 303 creates a node lock 401 to generate a coordinate resource version.

In step 836, a determination is made by administrative server 303 as to whether the content repository contains the latest version of the resource to be deleted. If the coordinated resource version generated in step 835 matches the version of the resource stored in the content repository (i.e., matches resource version 903 in the copy of node graph 402 stored in the content repository), then the content repository is said to be storing the latest version of the resource. If, however, the coordinated resource version generated in step 835 does not match the version of the resource stored in the content repository (i.e., does not match resource version 903 in the copy of node graph 402 stored in the content repository), then the content repository is said to not be storing the latest version of the resource.

If the content repository is not storing the latest version of the resource, then, in step 837, administrative server 303 fails the delete operation.

In step 838, administrative server 303 updates the content repository with the latest version of the resource.

In step 839, administrative server 303 releases node lock 401.

If, however, the content repository is storing the latest version of the resource, then, in step 840, administrative server 303 deletes the resource in the content repository.

In step 841, administrative server 303 releases node lock 401.

In step 842, administrative server 303 notifies the other content repositories (e.g., compute nodes 302C-302E) in the collection of repositories of the deleted resource via a pluggable replication transport (e.g., HTTP, SCP).

Referring to step 831, if, however, the consumer did not request to delete a resource in a content repository, then, referring to FIG. 8A, administrative server 303 determines whether it detects a repository (e.g., compute node 302A) joining a collection of repositories in step 801.

In this manner, resources are shared among repositories utilizing few resources (e.g., physical and virtual resources, such as processing usage, memory usage, storage usage) without the resource and resource metadata becoming out of sync via the use of node locks 401 and node graphs 402 in a peer-to-peer system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for sharing resources among remote repositories, the computer program product comprising a computer readable storage medium having program code embodied therewith, the program code comprising the programming instructions for:
   receiving a request to create, read, update or delete a resource in a content repository;
   receiving one or more of a resource name, a resource version and a resource fingerprint in connection with said request to create, read, update or delete said resource in said content repository; and
   determining if one or more of said received resource name, said received resource version and said received resource fingerprint match a respective one or more of a resource name, a resource version and a resource fingerprint stored in a node graph stored in a local repository, wherein said node graph comprises a hierarchical tree of nodes.

2. The computer program product as recited in claim 1, wherein the program code further comprises the programming instructions for:
   detecting a repository joining a collection of repositories; and
   replicating said node graph for said repository joining said collection of repositories.

3. The computer program product as recited in claim 1, wherein the program code further comprises the programming instructions for:
   detecting a repository leaving a collection of repositories; and
   deleting a copy of said node graph and associated resource in said leaving repository.

4. The computer program product as recited in claim 1, wherein the program code further comprises the programming instructions for:
   determining if said resource version in said node graph stored in said local repository matches a version of said resource in a copy of said node graph stored in said content repository in response to receiving a request to read said resource in said content repository by a consumer.

5. The computer program product as recited in claim 4, wherein the program code further comprises the programming instructions for:
   retrieving a latest version of said resource via a pluggable replication transport in response to said resource version in said node graph stored in said local repository not matching said version of said resource in said copy of said node graph stored in said content repository; and
   returning said retrieved latest version of said resource to said consumer.

6. The computer program product as recited in claim 1, wherein the program code further comprises the programming instructions for:

receiving a submission of a fingerprint for said resource from a producer of said resource in response to receiving a request to update said resource in said content repository; and determining if said received fingerprint matches said resource fingerprint in said node graph stored in said local repository.

7. The computer program product as recited in claim 6, wherein the program code further comprises the programming instructions for:

creating a node lock to generate a coordinated resource version;

updating said resource in said content repository and said node graph stored in both said local repository and said content repository;

releasing said node lock in response to updating said resource in said content repository and said node graph stored in both said local repository and said content repository; and notifying other content repositories of said updating of said resource via a pluggable notification mechanism.

8. The computer program product as recited in claim 1, wherein the program code further comprises the programming instructions for:

determining if said resource name exists in a node graph stored in said local repository in response to receiving a request to create said resource in said content repository.

9. The computer program product as recited in claim 8, wherein the program code further comprises the programming instructions for:

creating a node lock to generate a coordinated resource version in response to said resource name not existing in said node graph stored in said local repository;

creating said resource in said content repository and a corresponding node graph in both said local repository and said content repository;

releasing said node lock in response to creating said resource in said content repository and said corresponding node graph in both said local repository and said content repository; and notifying other content repositories of said creating of said resource via a pluggable notification mechanism.

10. The computer program product as recited in claim 1, wherein the program code further comprises the programming instructions for:

determining if said resource name and said resource fingerprint match said resource name and said resource fingerprint in said node graph stored in said local repository in response to receiving a request to delete said resource in said content repository.

11. A system, comprising:

a memory for storing a computer program for sharing resources among remote repositories; and a processor connected to said memory, wherein said processor is configured to execute the program instructions of the computer program comprising:

receiving a request to create, read, update or delete a resource in a content repository;

receiving one or more of a resource name, a resource version and a resource fingerprint in connection with said request to create, read, update or delete said resource in said content repository; and determining if one or more of said received resource name, said received resource version and said received resource fingerprint match a respective one or more of a resource name, a resource version and a resource fingerprint stored in a node graph stored in a local repository, wherein said node graph comprises a hierarchical tree of nodes.

12. The system as recited in claim 11, wherein the program instructions of the computer program further comprise:

detecting a repository joining a collection of repositories; and replicating said node graph for said repository joining said collection of repositories.

13. The system as recited in claim 11, wherein the program instructions of the computer program further comprise:

detecting a repository leaving a collection of repositories; and deleting a copy of said node graph and associated resource in said leaving repository.

14. The system as recited in claim 11, wherein the program instructions of the computer program further comprise:

determining if said resource version in said node graph stored in said local repository matches a version of said resource in a copy of said node graph stored in said content repository in response to receiving a request to read said resource in said content repository by a consumer.

15. The system as recited in claim 14, wherein the program instructions of the computer program further comprise:

retrieving a latest version of said resource via a pluggable replication transport in response to said resource version in said node graph stored in said local repository not matching said version of said resource in said copy of said node graph stored in said content repository; and returning said retrieved latest version of said resource to said consumer.

16. The system as recited in claim 11, wherein the program instructions of the computer program further comprise:

receiving a submission of a fingerprint for said resource from a producer of said resource in response to receiving a request to update said resource in said content repository; and determining if said received fingerprint matches said resource fingerprint in said node graph stored in said local repository.

17. The system as recited in claim 16, wherein the program instructions of the computer program further comprise:

creating a node lock to generate a coordinated resource version;

updating said resource in said content repository and said node graph stored in both said local repository and said content repository;

releasing said node lock in response to updating said resource in said content repository and said node graph stored in both said local repository and said content repository; and notifying other content repositories of said updating of said resource via a pluggable notification mechanism.

18. The system as recited in claim 11, wherein the program instructions of the computer program further comprise:

determining if said resource name exists in a node graph stored in said local repository in response to receiving a request to create said resource in said content repository.

19. The system as recited in claim 18, wherein the program instructions of the computer program further comprise:

creating a node lock to generate a coordinated resource version in response to said resource name not existing in said node graph stored in said local repository;

creating said resource in said content repository and a corresponding node graph in both said local repository and said content repository;

releasing said node lock in response to creating said resource in said content repository and said corresponding node graph in both said local repository and said content repository; and notifying other content repositories of said creating of said resource via a pluggable notification mechanism.

20. The system as recited in claim 11, wherein the program instructions of the computer program further comprise:

determining if said resource name and said resource fingerprint match said resource name and said resource fingerprint in said node graph stored in said local repository in response to receiving a request to delete said resource in said content repository.

* * * * *